United States Patent
Han et al.

(10) Patent No.: US 10,476,617 B2
(45) Date of Patent: Nov. 12, 2019

(54) METHOD OF DETECTING ILLEGAL BROADBAND RADIO SIGNAL

(71) Applicant: GITSN, INC., Seoul (KR)

(72) Inventors: Dong Jin Han, Seoul (KR); Chang-Ik Lee, Seoul (KR); Seong Hong, Gyeonggi-do (KR); Hyun-Young Shin, Gyeonggi-do (KR)

(73) Assignee: GITSN, INC., Seoul (KR)

( * ) Notice: Subject to any disclaimer, the term of this patent is extended or adjusted under 35 U.S.C. 154(b) by 0 days.

(21) Appl. No.: 16/309,126

(22) PCT Filed: Jun. 5, 2017

(86) PCT No.: PCT/KR2017/005834
§ 371 (c)(1),
(2) Date: Dec. 12, 2018

(87) PCT Pub. No.: WO2017/217683
PCT Pub. Date: Dec. 21, 2017

(65) Prior Publication Data
US 2019/0312657 A1  Oct. 10, 2019

(30) Foreign Application Priority Data

Jun. 13, 2016  (KR) .......................... 10-2016-0073387

(51) Int. Cl.
*H04B 1/00*   (2006.01)
*H04B 17/318*   (2015.01)
(Continued)

(52) U.S. Cl.
CPC ............. *H04B 17/318* (2015.01); *H04B 1/69* (2013.01); *H04L 41/0803* (2013.01); *H04W 12/1201* (2019.01)

(58) Field of Classification Search
CPC ... H04B 17/318; H04B 1/69; H04W 12/1201; H04L 41/0803
(Continued)

(56) References Cited

U.S. PATENT DOCUMENTS

| | | | | |
|---|---|---|---|---|
| 2007/0276540 A1* | 11/2007 | Okuda | ................. | G05D 1/0272 |
| | | | | 700/245 |
| 2008/0144757 A1* | 6/2008 | Ishii | ........................ | H04L 7/042 |
| | | | | 375/362 |
| 2016/0149603 A1* | 5/2016 | Igura | ...................... | H04B 17/29 |
| | | | | 455/226.3 |

FOREIGN PATENT DOCUMENTS

| | | |
|---|---|---|
| JP | 2009033347 | 2/2009 |
| KR | 1020010045669 | 6/2001 |

(Continued)

*Primary Examiner* — Don N Vo
(74) *Attorney, Agent, or Firm* — IPLA P.A.; James E. Bame

(57) ABSTRACT

A method of detecting an illegal broadband radio signal, includes receiving, by a reception unit, a surrounding radio signal at a place where an illegal radio signal is to be detected, generating, by a detection unit, reference frequency information by configuring a reference multi-spectrum table, generating, by the detection unit, detection frequency information by configuring a detection multi-spectrum table in such a way as to generate a basic resolution spectrum by extracting the signal of the preset frequency band as basic resolution from a detection radio signal detected in the place, and identifying, by a determination unit, whether a signal intensity value greater than a signal intensity value of the reference multi-spectrum table is present in the detection multi-spectrum table.

19 Claims, 2 Drawing Sheets

(51) Int. Cl.
*H04W 12/12* (2009.01)
*H04L 12/24* (2006.01)
*H04B 1/69* (2011.01)

(58) Field of Classification Search
USPC .......................................................... 375/130
See application file for complete search history.

(56) References Cited

FOREIGN PATENT DOCUMENTS

| KR | 1020010068295 | 7/2001 |
|----|---------------|--------|
| KR | 1020060099145 | 9/2006 |
| KR | 1020080043211 | 5/2008 |
| KR | 1020110022874 | 3/2011 |

\* cited by examiner

METHOD OF DETECTING ILLEGAL BROADBAND RADIO SIGNAL

CROSS REFERENCE

The present application claims the benefit of Korean Patent Application No. 10-2016-0073387 filed in the Korean Intellectual Property Office on Jun. 13, 2016, the entire contents of which are incorporated herein by reference.

BACKGROUND

The present invention relates to a method of detecting an illegal broadband radio signal and, more particularly, to a method of detecting an illegal broadband radio signal, which can effectively detect an illegal radio signal using a spread spectrum having signal intensity of lower power in a very wide frequency band or an illegal radio signal using an ultra wide band (UWB) by comparing a reference multi-spectrum table configured by extracting a surrounding radio signal as basic resolution and resolution of a plurality of positive integer multiples with a detection multi-spectrum table configured by extracting a detection radio signal as basic resolution and resolution of a plurality of positive integer multiples.

Today a device for detecting an illegal radio signal detects an illegal radio signal by extracting a radio signal of a preset frequency band as fine resolution.

However, the conventional device for detecting an illegal radio signal has a problem in that it is very vulnerable to detecting an illegal radio signal using a spread spectrum having signal intensity of lower power in a very wide frequency band or an illegal radio signal using an ultra wide band (UWB).

The background of the present invention is disclosed in Korean Patent Application Publication No. 10-2011-0022874 (Mar. 8, 2011).

SUMMARY OF THE INVENTION

The present invention has been made keeping in mind the above problems occurring in the prior art, and an object of the present invention is to provide a method of detecting an illegal broadband radio signal, which can effectively detect an illegal radio signal using a spread spectrum having signal intensity of lower power in a very wide frequency band or an illegal radio signal using an ultra wide band (UWB) by comparing a reference multi-spectrum table configured by extracting a surrounding radio signal as basic resolution and resolution of a plurality of positive integer multiples with a detection multi-spectrum table configured by extracting a detection radio signal as basic resolution and resolution of a plurality of positive integer multiples.

A method of detecting an illegal broadband radio signal according to an embodiment of the present invention includes receiving, by a reception unit, a surrounding radio signal at a place where an illegal radio signal is to be detected, generating, by a detection unit, reference frequency information by configuring a reference multi-spectrum table in such a way as to generate a basic resolution spectrum by extracting a signal of a preset frequency band as basic resolution from the received surrounding radio signal and to generate a multiple resolution spectrum by extracting the signal of the preset frequency band as resolution of a positive integer multiple of the basic resolution from the received surrounding radio signal, generating, by the detection unit, detection frequency information by configuring a detection multi-spectrum table in such a way as to generate a basic resolution spectrum by extracting the signal of the preset frequency band as basic resolution from a detection radio signal detected in the place where an illegal signal is to be detected and to generate a multiple resolution spectrum by extracting the signal of the preset frequency band as resolution of a positive integer multiple of the basic resolution from the detection radio signal, and identifying, by a determination unit, whether a signal intensity value greater than a signal intensity value of the reference multi-spectrum table is present in the detection multi-spectrum table.

A method of detecting an illegal broadband radio signal according to an embodiment of the present invention may further include identifying, by the determination unit, whether a signal intensity value greater than a signal intensity value of the basic resolution spectrum of the reference multi-spectrum table is present in the basic resolution spectrum of the detection multi-spectrum table by comparing a signal intensity value of the basic resolution spectrum of the detection multi-spectrum table with the signal intensity value of the basic resolution spectrum of the reference multi-spectrum table, when it is identified that a signal intensity value greater than a signal intensity value of the multiple resolution spectrum of the reference multi-spectrum table is present in the multiple resolution spectrum of the detection multi-spectrum table.

A method of detecting an illegal broadband radio signal according to an embodiment of the present invention may further include identifying, by the determination unit, that an illegal radio signal has been detected in the detection radio signal when it is identified that a signal intensity value greater than the signal intensity value of the basic resolution spectrum of the reference multi-spectrum table is not present in the basic resolution spectrum of the detection multi-spectrum table by comparing the signal intensity value of the basic resolution spectrum of the detection multi-spectrum table with the signal intensity value of the basic resolution spectrum of the reference multi-spectrum table.

A method of detecting an illegal broadband radio signal according to an embodiment of the present invention may further include storing the reference multi-spectrum table, the detection multi-spectrum table, and contents regarding the illegal radio signal identified to be detected by the determination unit in a storage unit, when it is identified that the illegal radio signal has been detected in the detection radio signal.

A method of detecting an illegal broadband radio signal according to an embodiment of the present invention may further include displaying the contents regarding the illegal radio identified to be detected by the determination unit on a display unit, when it is identified that the illegal radio signal has been detected in the detection radio signal.

A method of detecting an illegal broadband radio signal according to another embodiment of the present invention includes receiving, by a reception unit, a surrounding radio signal at a place where an illegal radio signal is to be detected, generating, by a detection unit, reference frequency information by configuring a reference multi-spectrum table in such a way as to generate a basic resolution spectrum by extracting a signal of a preset frequency band as basic resolution from the received surrounding radio signal and to generate a plurality of multiple resolution spectra by extracting the signal of the preset frequency band as resolution of a plurality of positive integer multiples of the basic resolution from the received surrounding radio signal, generating, by the detection unit, detection frequency information by configuring a detection multi-spectrum table in such a way as to generate a basic resolution spectrum by extracting the signal of the preset frequency band as basic resolution from a detection radio signal detected in the place where an illegal signal is to be detected and to generate a plurality of multiple resolution spectra by extracting the signal of the preset frequency band as resolution of a plurality of positive integer multiples of the basic resolution from the detection radio signal, and identifying, by a determination unit, whether a signal intensity value greater than a signal intensity value of the reference multi-spectrum table is present in the detection multi-spectrum table.

A method of detecting an illegal broadband radio signal according to another embodiment of the present invention may further include identifying, by the determination unit, whether a signal intensity value greater than a signal intensity value of a spectrum of a lower multiple right before a greatest multiple resolution of the reference multi-spectrum table is present in a spectrum of a lower multiple right before a greatest multiple resolution of the detection multi-spectrum table by comparing a signal intensity value of the spectrum of the lower multiple right before the greatest multiple resolution of the detection multi-spectrum table with the signal intensity value of the spectrum of the lower multiple right before the greatest multiple resolution of the reference multi-spectrum table, when it is identified that a signal intensity value greater than the signal intensity value of a greatest multiple resolution spectrum of the reference multi-spectrum table is present in the greatest multiple resolution spectrum of the detection multi-spectrum table.

A method of detecting an illegal broadband radio signal according to another embodiment of the present invention may further include identifying, by the determination unit, that an illegal radio signal has been detected in the detection radio signal when it is identified that a signal intensity value greater than the signal intensity value of the spectrum of the lower multiple right before the greatest multiple resolution of the reference multi-spectrum table is not present in the spectrum of the lower multiple right before the greatest multiple resolution of the detection multi-spectrum table.

A method of detecting an illegal broadband radio signal according to another embodiment of the present invention may further include identifying, by the determination unit, whether a signal intensity value greater than a signal intensity value of a spectrum of a lower multiple right before a greatest multiple resolution of the reference multi-spectrum table is present in a spectrum of a lower multiple right before a greatest multiple resolution of the detection multi-spectrum table by comparing a signal intensity value of the spectrum of the lower multiple right before the greatest multiple resolution of the detection multi-spectrum table with the signal intensity value of the spectrum of the lower multiple right before the greatest multiple resolution of the reference multi-spectrum table, when it is identified that a signal intensity value greater than the signal intensity value of the greatest multiple resolution spectrum of the reference multi-spectrum table is not present in the greatest multiple resolution spectrum of the detection multi-spectrum table.

A method of detecting an illegal broadband radio signal according to another embodiment of the present invention may further include identifying, by the determination unit, whether a signal intensity value greater than a signal intensity value of a spectrum of a multiple second lower than the greatest multiple resolution of the reference multi-spectrum table is present in a spectrum of a multiple second lower than the greatest multiple resolution of the detection multi-spectrum table by comparing a signal intensity value of a spectrum of a multiple second lower than the greatest multiple resolution of the detection multi-spectrum table with the signal intensity value of the spectrum of the multiple second lower than the greatest multiple resolution of the reference multi-spectrum table, when it is identified that a signal intensity value greater than the signal intensity value of the spectrum of the lower multiple right before the greatest multiple resolution of the reference multi-spectrum table is present in the spectrum of the lower multiple right before the greatest multiple resolution of the detection multi-spectrum table.

A method of detecting an illegal broadband radio signal according to another embodiment of the present invention may further include identifying, by the determination unit, that an illegal radio signal has been detected in the detection radio signal when it is identified that a signal intensity value greater than the signal intensity value of the spectrum of the multiple second lower than the greatest multiple resolution of the reference multi-spectrum table is not present in the spectrum of the multiple second lower than the greatest multiple resolution of the detection multi-spectrum table.

A method of detecting an illegal broadband radio signal according to another embodiment of the present invention may further include storing the reference multi-spectrum table, the detection multi-spectrum table, and contents regarding the illegal radio signal identified to be detected by the determination unit in a storage unit, when it is identified that the illegal radio signal has been detected in the detection radio signal.

A method of detecting an illegal broadband radio signal according to another embodiment of the present invention may further include displaying the contents regarding the illegal radio signal identified to be detected by the determination unit on a display unit, when it is identified that the illegal radio signal has been detected in the detection radio signal.

DETAILED DESCRIPTION OF THE INVENTION

Figure 1:
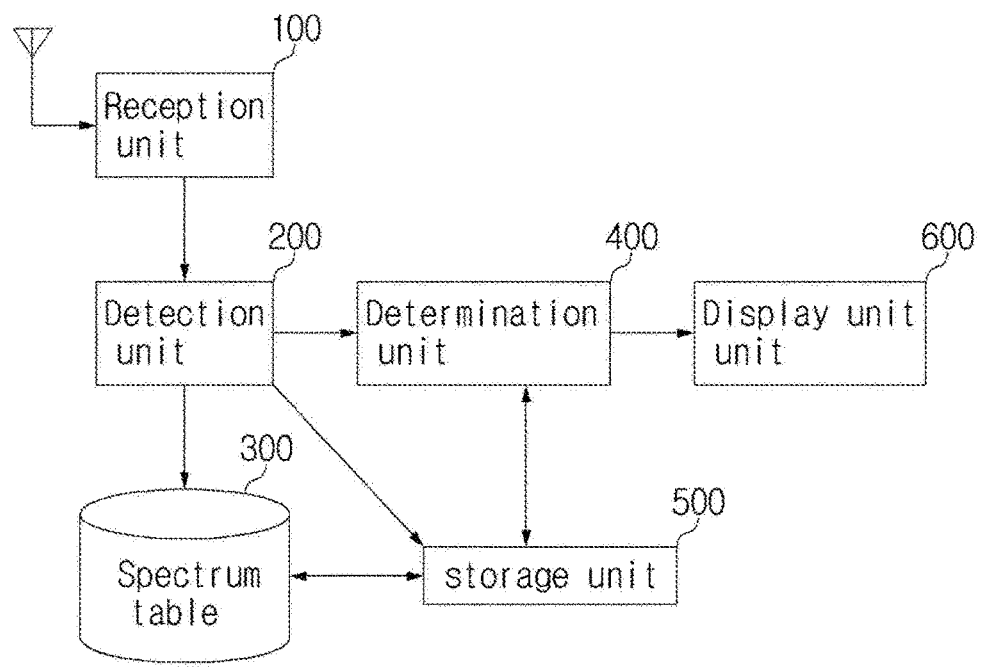
FIG. 1 shows the configuration of a system to which a method of detecting an illegal broadband radio signal according to an embodiment of the present invention is applied.

The details of other embodiments are included in the detailed description and the drawings.

The merits and characteristics of the present invention and a method of achieving the merits and characteristics will become more apparent from the embodiments described in detail in conjunction with the accompanying drawings. However, the present invention is not limited to the disclosed embodiments, but may be implemented in various different ways. The embodiments are provided to only complete the present invention and to allow those skilled in the art to fully understand the category of the present invention. The present invention is defined by the category of the claims. The same reference numerals will be used to refer to the same or similar elements throughout the drawings.

In a method of detecting an illegal broadband radio signal according to an embodiment of the present invention, as shown in FIG. 1, first, a reception unit 100 receives a surrounding radio signal at the place where an illegal radio signal will be detected.

Next, a detection unit 200 generates reference frequency information by configuring a reference multi-spectrum table in such a way as to generate a basic resolution spectrum by extracting a signal of a preset frequency band as basic resolution from the received surrounding radio signal and to generate a plurality of multiple resolution spectra by extracting the signal of a preset frequency band as resolution of a plurality of positive integer multiples of the basic resolution from the received surrounding radio signal.

Furthermore, the detection unit 200 generates detection frequency information by configuring a detection multi-spectrum table in such a way as to generate a basic resolution spectrum by extracting the signal of a preset frequency band as the basic resolution from a detection radio signal detected at the place where an illegal radio signal will be detected and to generate a plurality of multiple resolution spectra by extracting the signal of a preset frequency band as the resolution of a plurality of positive integer multiples of the basic resolution from the detection radio signal.

Figure 2:
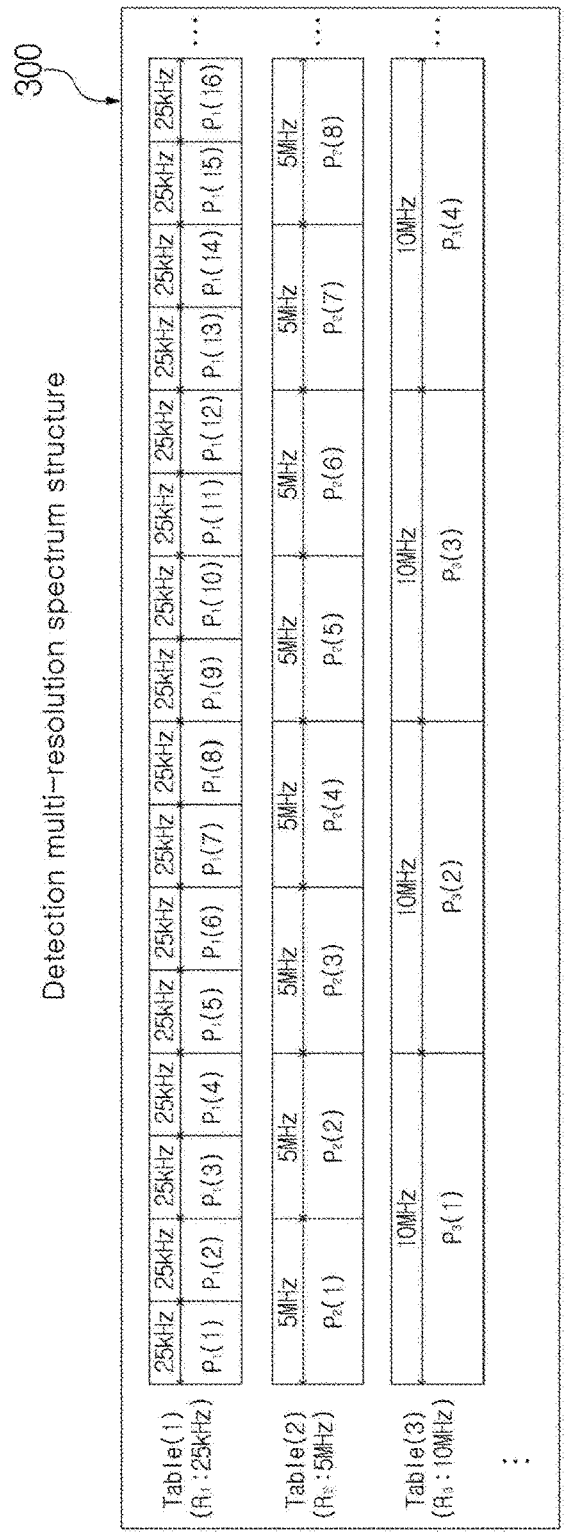
FIG. 2 shows the configuration of a reference multi-spectrum table and a detection multi-spectrum table adopted in the method of detecting an illegal broadband radio signal according to an embodiment of the present invention.

An equation for configuring a plurality of multiple spectra of the reference multi-spectrum table and the detection multi-spectrum table is as follows.

$$P_n(x) = \sum_{i=1}^{\frac{R_n}{R_1}} P_1\left(\frac{R_n}{R_1}X(x-1) + i\right)$$

wherein $R_1$ is resolution of the first table (basic resolution), $R_n$ is resolution of an n-th table, $P_1$ is a signal intensity value of the x-th section of the first table, and $P_n(x)$ is a signal intensity value of the x-th section of an n-th table For example, if the basic resolution of the reference multi-spectrum table and the detection multi-spectrum table is 25 KHz and a preset frequency band is 1 GHz, as shown in FIG. 2, the reference multi-spectrum table and the detection multi-spectrum table are configured by generating a basic resolution spectrum from P1(1) to P1(40000) with 25 KHz, generating a 200-times resolution spectrum from P2(1) to P2(200) with 5 MHz, which has resolution 200 times higher than the resolution of 25 KHz, and generating a 400-times resolution spectrum from P3(1) to P3(100) with 10 MHz, which has resolution 400 times higher than the resolution of 25 KHz.

In this case, each of the reference multi-spectrum table and the detection multi-spectrum table does not need to essentially include three or more spectra, and may include two spectra. That is, each of the reference multi-spectrum table and the detection multi-spectrum table may include only the 25 KHz resolution spectrum and the 200-times resolution spectrum.

Next, a determination unit 400 identifies whether a signal intensity value greater than a signal intensity value of a spectrum of a lower multiple right before the greatest multiple resolution of the reference multi-spectrum table is present in a spectrum of a lower multiple right before the greatest multiple resolution of the detection multi-spectrum table by comparing the signal intensity value of the spectrum of the lower multiple right before the greatest multiple resolution of the detection multi-spectrum table with the signal intensity value of the spectrum of the lower multiple right before the greatest multiple resolution of the reference multi-spectrum table.

Specifically, as shown in FIG. 2, the determination unit 400 identifies whether a signal intensity value greater than a signal intensity value of a spectrum from P3(1) to P3(100) of the reference multi-spectrum table is present in a spectrum from P3(1) to P3(100) of the detection multi-spectrum table by comparing the signal intensity value of the spectrum from P3(1) to P3(100) of the detection multi-spectrum table with the signal intensity value of the spectrum from P3(1) to P3(100) of the reference multi-spectrum table.

If, as a result of the comparison, it is identified that a signal intensity value greater than the signal intensity value of the greatest multiple resolution spectrum of the reference multi-spectrum table is present in the greatest multiple resolution spectrum of the detection multi-spectrum table, the determination unit 400 identifies whether a signal intensity value greater than a signal intensity value of a spectrum of a lower multiple right before the greatest multiple resolution of the reference multi-spectrum table is present in a spectrum of a lower multiple right before the greatest multiple resolution of the detection multi-spectrum table by comparing the signal intensity value of the spectrum of the lower multiple right before the greatest multiple resolution of the detection multi-spectrum table with the signal intensity value of the spectrum of the lower multiple right before the greatest multiple resolution of the reference multi-spectrum table.

Specifically, as shown in FIG. 2, when it is identified that a signal intensity value greater than the signal intensity value of the spectrum from P3(1) to P3(100) of the reference multi-spectrum table is present in the spectrum from P3(1) to P3(100) of the detection multi-spectrum table, the determination unit 400 identifies whether a signal intensity value greater than a signal intensity value of a spectrum from P2(1) to P2(200) of the reference multi-spectrum table is present in a spectrum from P2(1) to P2(200) of the detection multi-spectrum table by comparing the signal intensity value of the spectrum from P2(1) to P2(200) of the detection multi-spectrum table with the signal intensity value of the spectrum from P2(1) to P2(200) of the reference multi-spectrum table.

Next, when it is identified that a signal intensity value greater than the signal intensity value of a spectrum of a lower multiple right before the greatest multiple resolution of the reference multi-spectrum table is not present in a spectrum of a lower multiple right before the greatest multiple resolution of the detection multi-spectrum table, the determination unit 400 identifies that an illegal radio signal has been detected in the detection radio signal.

Specifically, as shown in FIG. 2, when it is identified that a signal intensity value greater than the signal intensity value of the spectrum from P2(1) to P2(200) of the reference multi-spectrum table is not present in the spectrum from P2(1) to P2(200) of the detection multi-spectrum table by comparing the signal intensity value of the spectrum from P2(1) to P2(200) of the detection multi-spectrum table with the signal intensity value of the spectrum from P2(1) to P2(200) of the reference multi-spectrum table, the determination unit 400 identifies that an illegal radio signal has been detected in the detection radio signal.

Next, when it is identified that a signal intensity value greater than the signal intensity value of the greatest multiple resolution spectrum of the reference multi-spectrum table is not present in the greatest multiple resolution spectrum of the detection multi-spectrum table, the determination unit 400 identifies whether a signal intensity value greater than a signal intensity value of a spectrum of a lower multiple right before the greatest multiple resolution of the reference multi-spectrum table is present in a spectrum of a lower multiple right before the greatest multiple resolution of the detection multi-spectrum table by comparing the signal intensity value of the spectrum of the lower multiple right before the greatest multiple resolution of the detection multi-spectrum table with the signal intensity value of the spectrum of the lower multiple right before the greatest multiple resolution of the reference multi-spectrum table.

Specifically, as shown in FIG. 2, when it is identified that a signal intensity value greater than the signal intensity value of the spectrum from P3(1) to P3(100) of the reference multi-spectrum table is not present in the spectrum from P3(1) to P3(100) of the detection multi-spectrum table, the determination unit 400 identifies whether a signal intensity value greater than the signal intensity value of the spectrum from P2(1) to P2(200) of the reference multi-spectrum table is present in the spectrum from P2(1) to P2(200) of the detection multi-spectrum table by comparing the signal intensity value of the spectrum from P2(1) to P2(200) of the detection multi-spectrum table with the signal intensity value of the spectrum from P2(1) to P2(200) of the reference multi-spectrum table.

Next, when the determination unit 400 identifies that a signal intensity value greater than the signal intensity value of the spectrum of the lower multiple right before the greatest multiple resolution of the reference multi-spectrum table is present in the spectrum of the lower multiple right before the greatest multiple resolution of the detection multi-spectrum table, the determination unit 400 identifies whether a signal intensity value greater than a signal intensity value of a spectrum of a multiple second lower than the greatest multiple resolution of the reference multi-spectrum table is present in a spectrum of a multiple second lower than the greatest multiple resolution of the detection multi-spectrum table by comparing the signal intensity value of the spectrum of the multiple second lower than the greatest multiple resolution of the detection multi-spectrum table with the signal intensity value of the spectrum of the multiple second lower than the greatest multiple resolution of the reference multi-spectrum table.

Specifically, as shown in FIG. 2, when it is identified that a signal intensity value greater than the signal intensity value of the spectrum from P2(1) to P2(200) of the reference multi-spectrum table is present in the spectrum from P2(1) to P2(200) of the detection multi-spectrum table, the determination unit 400 identifies whether a signal intensity value greater than a signal intensity value of a spectrum from P1(1) to P1(40000) of the reference multi-spectrum table is present in a spectrum from P1(1) to P1(40000) of the detection multi-spectrum table by comparing the signal intensity value of the spectrum from P1(1) to P1(40000) of the detection multi-spectrum table with the signal intensity value of the spectrum from P1(1) to P1(40000) of the reference multi-spectrum table.

Next, when it is identified that a signal intensity value greater than the signal intensity value of the spectrum of the multiple second lower than the greatest multiple resolution of the reference multi-spectrum table is not present in the spectrum of the multiple second lower than the greatest multiple resolution of the detection multi-spectrum table, the determination unit 400 identifies that an illegal radio signal has been detected in the detection radio signal.

Specifically, as shown in FIG. 2, when it is identified that a signal intensity value greater than the signal intensity value of the spectrum from P1(1) to P1(40000) of the reference multi-spectrum table is not present in the spectrum from P1(1) to P1(40000) of the detection multi-spectrum table by comparing the signal intensity value of the spectrum from P1(1) to P1(40000) of the detection multi-spectrum table with the signal intensity value of the spectrum from P1(1) to P1(40000) of the reference multi-spectrum table, the determination unit 400 identifies that an illegal radio signal has been detected in the detection radio signal.

Next, when it is identified that an illegal radio signal has been detected in the detection radio signal, a storage unit 500 stores the reference multi-spectrum table, the detection multi-spectrum table, and contents regarding the illegal radio signal identified to be detected by the determination unit 400.

Next, when it is identified that an illegal radio signal has been detected in the detection radio signal, a display unit 600 displays the contents regarding the illegal radio signal identified to be detected by the determination unit 400.

The method of detecting an illegal broadband radio signal according to embodiments of the present invention can effectively detect an illegal radio signal using a spread spectrum having signal intensity of lower power in a very wide frequency band or an illegal radio signal using an ultra wide band (UWB) by comparing a reference multi-spectrum table configured by extracting a surrounding radio signal as basic resolution and resolution of a plurality of positive integer multiples with a detection multi-spectrum table configured by extracting a detection radio signal as basic resolution and resolution of a plurality of positive integer multiples.

Those skilled in the art to which the present invention pertains will appreciate that the present invention may be practiced in other detailed forms without changing the technical spirit or essential characteristics of the present invention. Accordingly, the above-described embodiments should be construed as being only illustrative not as being restrictive from all aspects.

The scope of the present invention is defined by the appended claims rather than the detailed description, and the present invention should be construed as covering all modifications or variations derived from the meaning and scope of the appended claims and their equivalents.

What is claimed is:

1. A method of detecting an illegal broadband radio signal, the method comprising:

receiving, by a reception unit, a surrounding radio signal at a place where an illegal radio signal is to be detected;

generating, by a detection unit, reference frequency information by configuring a reference multi-spectrum table in such a way as to generate a basic resolution spectrum by extracting a signal of a preset frequency band as basic resolution from the received surrounding radio signal and to generate a multiple resolution spectrum by extracting the signal of the preset frequency band as resolution of a positive integer multiple of the basic resolution from the received surrounding radio signal;

generating, by the detection unit, detection frequency information by configuring a detection multi-spectrum table in such a way as to generate a basic resolution spectrum by extracting the signal of the preset frequency band as basic resolution from a detection radio signal detected in the place where an illegal signal is to be detected and to generate a multiple resolution spectrum by extracting the signal of the preset frequency band as resolution of a positive integer multiple of the basic resolution from the detection radio signal; and identifying, by a determination unit, whether a signal intensity value greater than a signal intensity value of the reference multi-spectrum table is present in the detection multi-spectrum table.

2. The method of claim 1, further comprising identifying, by the determination unit, whether a signal intensity value greater than a signal intensity value of the basic resolution spectrum of the reference multi-spectrum table is present in the basic resolution spectrum of the detection multi-spectrum table by comparing a signal intensity value of the basic resolution spectrum of the detection multi-spectrum table with the signal intensity value of the basic resolution spectrum of the reference multi-spectrum table, when it is identified that a signal intensity value greater than a signal intensity value of the multiple resolution spectrum of the reference multi-spectrum table is present in the multiple resolution spectrum of the detection multi-spectrum table.

3. The method of claim 2, further comprising identifying, by the determination unit, that an illegal radio signal has been detected in the detection radio signal when it is identified that a signal intensity value greater than the signal intensity value of the basic resolution spectrum of the reference multi-spectrum table is not present in the basic resolution spectrum of the detection multi-spectrum table by comparing the signal intensity value of the basic resolution spectrum of the detection multi-spectrum table with the signal intensity value of the basic resolution spectrum of the reference multi-spectrum table.

4. The method of claim 3, further comprising storing the reference multi-spectrum table, the detection multi-spectrum table, and contents regarding the illegal radio signal identified to be detected by the determination unit in a storage unit, when it is identified that the illegal radio signal has been detected in the detection radio signal.

5. The method of claim 3, further comprising displaying the contents regarding the illegal radio identified to be detected by the determination unit on a display unit, when it is identified that the illegal radio signal has been detected in the detection radio signal.

6. A method of detecting an illegal broadband radio signal, comprising steps of:
receiving, by a reception unit, a surrounding radio signal at a place where an illegal radio signal is to be detected;
generating, by a detection unit, reference frequency information by configuring a reference multi-spectrum table in such a way as to generate a basic resolution spectrum by extracting a signal of a preset frequency band as basic resolution from the received surrounding radio signal and to generate a plurality of multiple resolution spectra by extracting the signal of the preset frequency band as resolution of a plurality of positive integer multiples of the basic resolution from the received surrounding radio signal;
generating, by the detection unit, detection frequency information by configuring a detection multi-spectrum table in such a way as to generate a basic resolution spectrum by extracting the signal of the preset frequency band as basic resolution from a detection radio signal detected in the place where an illegal signal is to be detected and to generate a plurality of multiple resolution spectra by extracting the signal of the preset frequency band as resolution of a plurality of positive integer multiples of the basic resolution from the detection radio signal; and
identifying, by a determination unit, whether a signal intensity value greater than a signal intensity value of the reference multi-spectrum table is present in the detection multi-spectrum table.

7. The method of claim 6, further comprising identifying, by the determination unit, whether a signal intensity value greater than a signal intensity value of a spectrum of a lower multiple right before a greatest multiple resolution of the reference multi-spectrum table is present in a spectrum of a lower multiple right before a greatest multiple resolution of the detection multi-spectrum table by comparing a signal intensity value of the spectrum of the lower multiple right before the greatest multiple resolution of the detection multi-spectrum table with the signal intensity value of the spectrum of the lower multiple right before the greatest multiple resolution of the reference multi-spectrum table, when it is identified that a signal intensity value greater than the signal intensity value of a greatest multiple resolution spectrum of the reference multi-spectrum table is present in the greatest multiple resolution spectrum of the detection multi-spectrum table.

8. The method of claim 7, further comprising identifying, by the determination unit, that an illegal radio signal has been detected in the detection radio signal when it is identified that a signal intensity value greater than the signal intensity value of the spectrum of the lower multiple right before the greatest multiple resolution of the reference multi-spectrum table is not present in the spectrum of the lower multiple right before the greatest multiple resolution of the detection multi-spectrum table.

9. The method of claim 8, further comprising storing the reference multi-spectrum table, the detection multi-spectrum table, and contents regarding the illegal radio signal identified to be detected by the determination unit in a storage unit, when it is identified that the illegal radio signal has been detected in the detection radio signal.

10. The method of claim 8, further comprising displaying the contents regarding the illegal radio signal identified to be detected by the determination unit on a display unit, when it is identified that the illegal radio signal has been detected in the detection radio signal.

11. The method of claim 6, further comprising identifying, by the determination unit, whether a signal intensity value greater than a signal intensity value of a spectrum of a lower multiple right before a greatest multiple resolution of the reference multi-spectrum table is present in a spectrum of a lower multiple right before a greatest multiple resolution of the detection multi-spectrum table by comparing a signal intensity value of the spectrum of the lower multiple right before the greatest multiple resolution of the detection multi-spectrum table with the signal intensity value of the spectrum of the lower multiple right before the greatest multiple resolution of the reference multi-spectrum table, when it is identified that a signal intensity value greater than the signal intensity value of the greatest multiple resolution spectrum of the reference multi-spectrum table is not present in the greatest multiple resolution spectrum of the detection multi-spectrum table.

12. The method of claim 11, further comprising storing the reference multi-spectrum table, the detection multi-spectrum table, and contents regarding the illegal radio signal identified to be detected by the determination unit in a storage unit, when it is identified that the illegal radio signal has been detected in the detection radio signal.

13. The method of claim 11, further comprising displaying the contents regarding the illegal radio signal identified to be detected by the determination unit on a display unit, when it is identified that the illegal radio signal has been detected in the detection radio signal.

14. The method of claim 11, further comprising identifying, by the determination unit, whether a signal intensity value greater than a signal intensity value of a spectrum of a multiple second lower than the greatest multiple resolution of the reference multi-spectrum table is present in a spectrum of a multiple second lower than the greatest multiple resolution of the detection multi-spectrum table by comparing a signal intensity value of a spectrum of a multiple second lower than the greatest multiple resolution of the detection multi-spectrum table with the signal intensity value of the spectrum of the multiple second lower than the greatest multiple resolution of the reference multi-spectrum table, when it is identified that a signal intensity value greater than the signal intensity value of the spectrum of the lower multiple right before the greatest multiple resolution of the reference multi-spectrum table is present in the spectrum of the lower multiple right before the greatest multiple resolution of the detection multi-spectrum table.

15. The method of claim 14, further comprising storing the reference multi-spectrum table, the detection multi-spectrum table, and contents regarding the illegal radio signal identified to be detected by the determination unit in a storage unit, when it is identified that the illegal radio signal has been detected in the detection radio signal.

16. The method of claim 14, further comprising displaying the contents regarding the illegal radio signal identified to be detected by the determination unit on a display unit, when it is identified that the illegal radio signal has been detected in the detection radio signal.

17. The method of claim 14, further comprising identifying, by the determination unit, that an illegal radio signal has been detected in the detection radio signal when it is identified that a signal intensity value greater than the signal intensity value of the spectrum of the multiple second lower than the greatest multiple resolution of the reference multi-spectrum table is not present in the spectrum of the multiple second lower than the greatest multiple resolution of the detection multi-spectrum table.

18. The method of claim 17, further comprising storing the reference multi-spectrum table, the detection multi-spectrum table, and contents regarding the illegal radio signal identified to be detected by the determination unit in a storage unit, when it is identified that the illegal radio signal has been detected in the detection radio signal.

19. The method of claim 17, further comprising displaying the contents regarding the illegal radio signal identified to be detected by the determination unit on a display unit, when it is identified that the illegal radio signal has been detected in the detection radio signal.

\* \* \* \* \*